United States Patent
Vrudhula et al.

(10) Patent No.: US 12,008,392 B2
(45) Date of Patent: *Jun. 11, 2024

(54) APPLICATION COMPONENT IDENTIFICATION AND ANALYSIS IN A VIRTUALIZED COMPUTING SYSTEM

(71) Applicant: VMware, Inc., Palo Alto, CA (US)

(72) Inventors: Padmaja Vrudhula, Edmonds, WA (US); Timothy Michael Jones, Santa Barbara, CA (US); Matthew David Conger-Eldeen, Brighton, CO (US); Nicholas Seemiller, Denver, CO (US)

(73) Assignee: VMware LLC, Palo Alto, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/383,603

(22) Filed: Jul. 23, 2021

(65) Prior Publication Data

US 2023/0022079 A1 Jan. 26, 2023

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); *G06F 2009/45595* (2013.01)

(58) Field of Classification Search
CPC ............. G06F 9/45558; G06F 9/45545; G06F 2009/4557; G06F 2009/45595
See application file for complete search history.

(56) References Cited

U.S. PATENT DOCUMENTS

| | | | |
|---|---|---|---|
| 9,769,131 B1* | 9/2017 | Hartley | H04W 12/033 |
| 2008/0052102 A1 | 2/2008 | Taneja et al. | |
| 2015/0277775 A1* | 10/2015 | Manoharan | G06F 3/061 |
| | | | 711/123 |
| 2016/0198010 A1 | 7/2016 | Roy et al. | |
| 2016/0342403 A1* | 11/2016 | Zamir | G06F 8/61 |
| 2018/0196684 A1* | 7/2018 | Pengfei | G06F 21/64 |
| 2019/0034297 A1* | 1/2019 | Basur Shankarappa | |
| | | | G06F 3/0647 |
| 2019/0268164 A1* | 8/2019 | Rossetti | H04L 67/1097 |
| 2020/0104110 A1* | 4/2020 | Singh | G06F 11/1433 |
| 2021/0200819 A1 | 7/2021 | Earhart et al. | |

OTHER PUBLICATIONS

Non-Final Office Action dated Sep. 27, 2023 in U.S. Appl. No. 17/513,925, 22 pages.

* cited by examiner

*Primary Examiner* — Dong U Kim
(74) *Attorney, Agent, or Firm* — Kim & Stewart LLP

(57) ABSTRACT

An example method of application identification in a virtualized computing system having a cluster of hosts, the hosts including virtualization layers supporting virtual machines (VMs), is described. The method includes: executing, by application analysis software, process discovery agents for the VMs; receiving, at the application analysis software from the process discovery agents, process metadata describing processes executing on the VMs; generating signatures for the processes based on the process metadata; and determining components of an application based on the signatures.

20 Claims, 7 Drawing Sheets

APPLICATION COMPONENT IDENTIFICATION AND ANALYSIS IN A VIRTUALIZED COMPUTING SYSTEM

Applications today are deployed onto a combination of virtual machines (VMs), containers, application services, physical servers without virtualization, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin"), or an automated tool on behalf of an Infrastructure as a Service (IaaS), interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

Applications executing in a virtualized computing system can include many software components. An administrator's view of the applications via virtualization management tools can drift from the actual state of the applications as the virtualized computing system and applications evolve over time. A VI admin may be unaware of the application software executing in the VMs. In addition, an application can undergo many changes from first deployment, some of which affect operations. Application changes can occur from application-specific code (internal or vender provided), underlying OS patching, hardware patching/changing, and various security-related requirements It is desirable to provide an application discovery process that is automated and provides a more accurate view of applications, their components, relationships, dependencies, and interdependencies.

SUMMARY

An example method of application identification in a virtualized computing system having a cluster of hosts, the hosts including virtualization layers supporting virtual machines (VMs), is described. The method includes: executing, by application analysis software, process discovery agents for the VMs; receiving, at the application analysis software from the process discovery agents, process metadata describing processes executing on the VMs; generating signatures for the processes based on the process metadata; and determining components of an application based on the signatures.

Further embodiments include a non-transitory computer-readable storage medium comprising instructions that cause a computer system to carry out the above methods, as well as a computer system configured to carry out the above methods.

DETAILED DESCRIPTION

Figure 1:
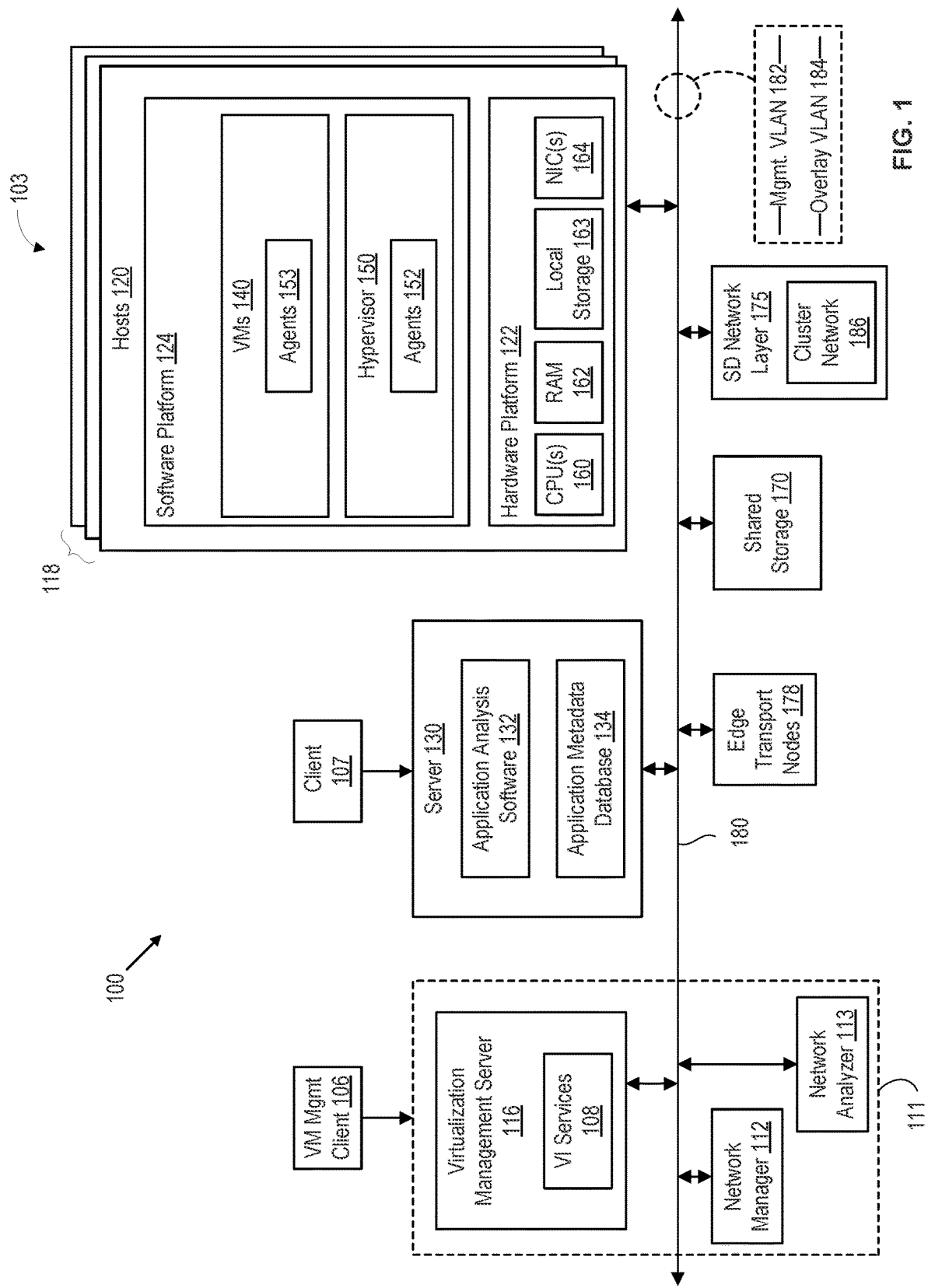
FIG. 1 is a block diagram of a virtualized computing system in which embodiments described herein may be implemented.

Application component identification and analysis in a virtualized computing system are described. The techniques provide an automated process that detects individual processes as application components, as well as the topology of interdependencies between application components. The techniques derive data directly from the deployed virtualized environment to provide an accurate representation. The techniques are flexible and can be customized dynamically to identify and collect data on application components at any time, without necessarily changing the software (or needing a patch or update). These and further aspects of the techniques are described below with respect to the drawings.

As used herein, a "process" is an instance of a computer program. A process includes a portion of the computer's virtual memory, which is occupied by the computer program's executable code, and a data structure maintained by the computer's operating system. For example, the Linux® operating system maintains a data structure for each process known as a Process Control Block (PCB). The data structure includes information such as the process running state, the process scheduling state, memory management information, interprocess communication (IPC) information, open file descriptors held by the process, and the like. Other commercial operating systems include similar data structures for each process.

An "application component" or "component" is a representation of a running process or running processes on a computer.—A component can include a collection of attributes for the process(es) running on the computer. For example, a set of static identification attributes (e.g., unique identifier of a host on which the process executes, name of process, full path of the executable of the process, command line parameters used to invoke the process, working directory, environment variables, start time of the process, the process owner, and the like). The host identifier can be, for example, a virtual machine identifier (e.g., a VM universally unique identifier (UUID), a virtual machine managed object identifier, or a combination thereof. The collected attributes can further include the current state of process(es) (e.g., a list of open socket file descriptors, a list of open disk files, and the like). In general (but not always), a component has a one-to-one relationship with a running process on a computer. In some cases, a component can be associated with multiple processes.

An "application" is an implementation of functionality that includes one or more components, communication between components, and services supporting the components. The components execute on computer(s), such as virtual machines (VMs) on host(s) in a host cluster of a virtualized computing environment.

A "component signature" is a set of static identification attributes or a process that can be used to classify the process under a name ("component type"). The component type characterizes a common set of functionalities and behaviors of the process across computers and/or operating systems. Since a process is essentially a running instance of its executable, in embodiments, a component signature includes: a regular expression having the process name and/or executable path; and a regular expression encoding an expected pattern in the process's command line arguments. Post identification of components, additional metadata like version, can be collected with custom collector scripts specific to that component type.

For the component signature, the "component type" is a name of a common set of functionalities and behaviors of a process or processes across computing architectures and/or operating systems. For example, Apache Tomcat, whether running on a Linux® operating system or a Windows® operating system, belongs to the same component type APACHE TOMCAT.

A virtual machine (VM) includes an operating system (guest OS) that shares the physical resources of a host. Although aspects of the techniques are described with respect to applications running on VMs, the techniques can be applied to applications running on any computer, physical or virtual, as long as the computer can be accessed over a network, allows execution of downloaded programs, and allows transmission of collected data back to a central system.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of virtual local area networks (VLANs) to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fiber channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA An embodiment of software platform 124 is discussed further below with respect to FIG. 2.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 18.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA If network manager 112 is absent, virtualization management server 116 can orchestrate SD network layer 175.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

Virtualization management server 116 and network manager 112 comprise a virtual infrastructure (VI) control plane 111 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS), high-availability (HA) service, single sign-on (SSO) service, virtualization management daemon, vSAN service, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like. For purposes of clarity, examples described herein include a VI admin interacting with virtualization management server 116 to perform various functions. In some embodiments, automated tool(s) can take the place of the VI admin, for example, automated tool(s) executing on behalf of an IaaS.

Virtualized computing system 100 includes a server 130 executing application analysis software 132. Server 130 may be a physical server or a VM 140 in host cluster 118. In another embodiment, application analysis software 132 can execute in another server, such as virtualization management server 116. Application analysis software 132 is configured to discover and collect metadata about application components and its dependent services executing on VMs 140. The collected metadata is stored in application metadata database 134. The collected metadata is useful for discovering the nature of constituent components of target applications. The collected metadata can be used for various purposes, such as re-platforming a traditional application executing on operating systems to a containerized application executing in a container-based environment (e.g., Kubernetes®). As discussed herein, the collected metadata is processed for identifying component types, which is achieved using component signatures. Application analysis software 132 can be configured with predefined component signatures, which capture popular applications. The component signatures can be generated from internally developed applications or those purchased from a vendor (e.g., customer off the shelf (COTS) applications), or some combination thereof. However, application analysis software 132 allows for dynamic addition of component signatures and for modification of predefined component signatures. A user can access application analysis software 132 through a client 107.

In embodiments, application analysis software 132 installs agents 153 in VMs 140 to collect information about executing processes during metadata collection for application components. The term installation, as used herein, encompasses various forms of having agents 153 be executed in VMs 140, such as a conventional installation process, adding agents 153 to a template from which VMs 140 are provisioned, attaching virtual disks to VMs 140 having executable code of agents 153, instructing an interpreter in VMs 140 to execute a sequence of commands as agents 153, and the like. In general, application analysis software 132 configures VMs 140 to execute agents 153 using any or a combination of such techniques. In other embodiments, application analysis software 132 can execute agents 153 as a Software-as-a-Service (SaaS), rather than in VMs 140. Agents 153 can execute externally to VMs 140 and access VMs 140 remotely to perform their functions. For purposes of clarity by example, agents 153 are described below as executing in VMs 140, but it is to be understood that the embodiments are not so limited and agents 153 can execute external to VMs 140.

In embodiments, virtualized computing system 100 can include network analyzer 113. Network analyzer 113 is configured to perform various network analyses on SD network layer 175 and VMs 140 connected thereto. For example, network analyzer 113 can collect netflow information from virtualization management server 116 and/or network manager 112. The netflow information describes the network traffic flows between VMs 140. Network analyzer 113 can also detect communications with external services, such as domain name service (DNS), network time protocol (NTP), and the like as part of the netflow information. In embodiments, network analyzer 113 can be implemented using VMware vRealize® Network Insight™ commercially available from VMware, Inc. of Palo Alto, CA Application analysis software 132 can leverage netflow information collected by network analyzer 113 to detect traffic flows between VMs and map such traffic flows to the identified application components to determine the application topology.

Figure 2:
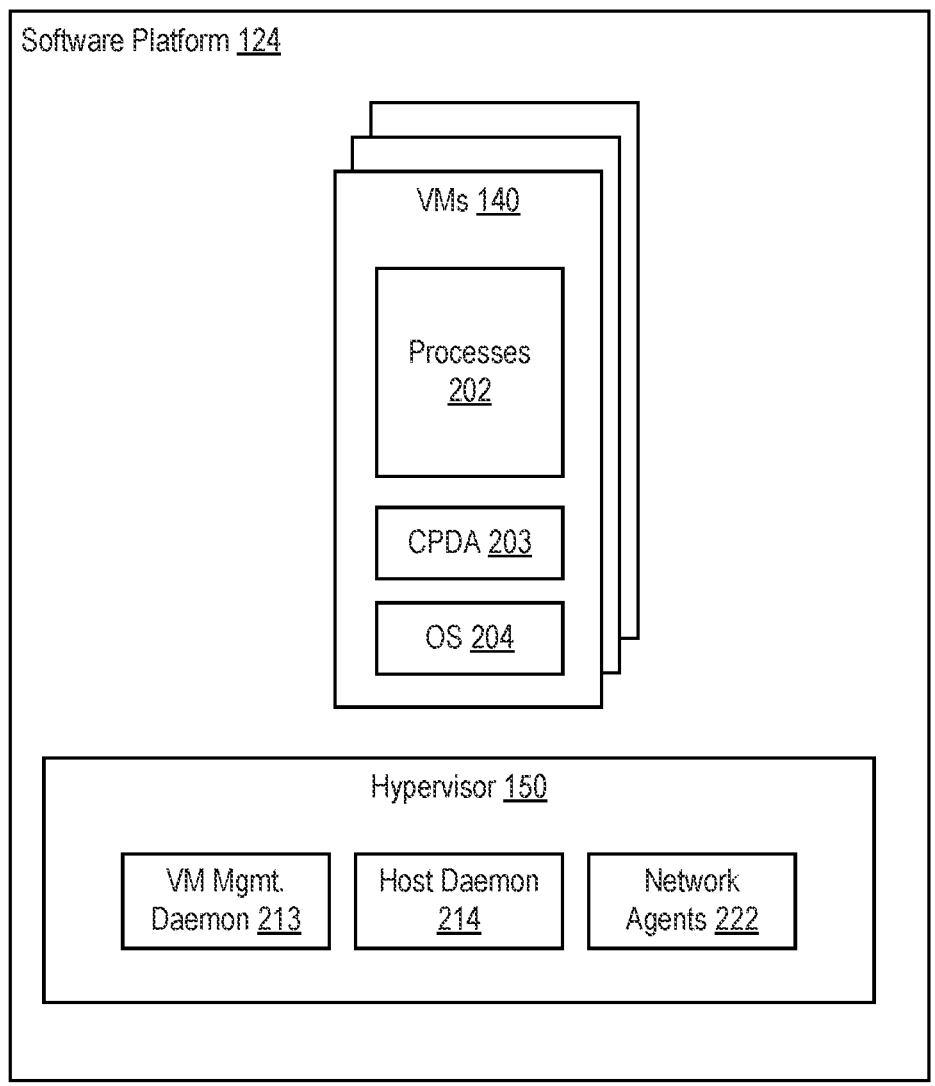
FIG. 2 is a block diagram depicting a software platform according to an embodiment.

FIG. 2 is a block diagram depicting software platform 124 according to an embodiment. As described above, software platform 124 of host 120 includes hypervisor 150 that supports execution of VMs 140. In an embodiment, hypervisor 150 includes a VM management daemon 213, a host daemon 214, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs 140. Network agents 222 comprise agents 152 installed by network manager 112. Network agents 222 are configured to cooperate with network manager 112 to implement logical network services. Network agents 222 configure the respective host as a transport node in a cluster 103 of transport nodes. Each VM 140 has processes 202 running therein on top of an OS 204.

Application analysis software 132 can install agents 153 into VMs 140 to scan processes 202, which includes common process discovery agent (CPDA) 203. The implementation of CPDA 203 is operating system specific. CPDA 203 is configured to obtain details of processes 202 from data structures maintained by OS 204 (e.g., the PCB in Linux), such as process running state, the process scheduling state, memory management information, interprocess communication (IPC) information, open file descriptors held by the process environment variables, command-line and arguments, and the like ("process metadata"). CPDA 203 is configured to return collected process metadata to application analysis software 132. Application analysis software 132 can also allow a manual change by a user or an application programming interface (API), to the collected process metadata, for example, in case the association of a process to the application is inaccurate or needs to be overridden.

Figure 3:
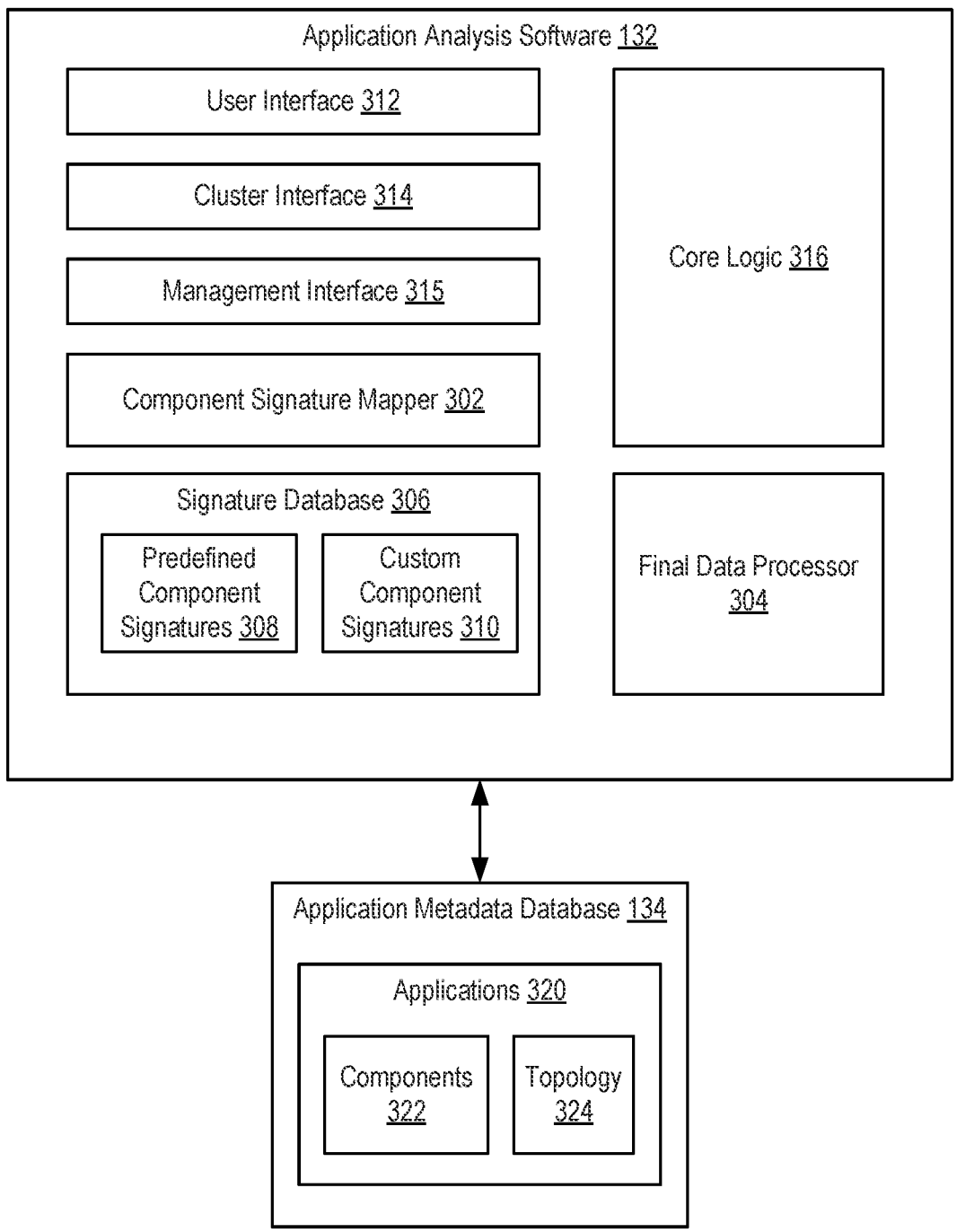
FIG. 3 is a block diagram depicting application analysis software according to an embodiment.

FIG. 3 is a block diagram depicting application analysis software 132 according to an embodiment. Application analysis software 132 includes a user interface 312, a cluster interface 314, a management interface 315, a component signature mapper 302, core logic 316, a signature database 306, and a final data processor 304. Users interact with application analysis software 132 through user interface 312. Application analysis software 132 communicates with VMs 140 through cluster interface 314, which includes installing agents 153 in VMs 140 and receiving data from agents 153. Management interface 315 communicates with virtualization management server 116, network manager 112, and/or network analyzer 113. Component signature mapper 302 is configured to receive process metadata from agents 153 (through cluster interface 314) and determine component signatures. Component signature mapper 302 compares generated component signatures against those in signature database 306 to determine component types. Signature database 306 includes predefined component signatures 308 and can include custom component signatures 310. Custom component signatures 310 can include those defined by the user or those of predefined component signatures 308 that have been modified by the user. Core logic 316 comprises various control logic and other logic configured to coordinate operation of application analysis software 132. Final data processor 304 is configured to merge collected metadata for storage in application metadata database 134. The metadata stored in application metadata database 134 defines applications 320, each of which includes components 322 and a topology 324.

Figure 4:
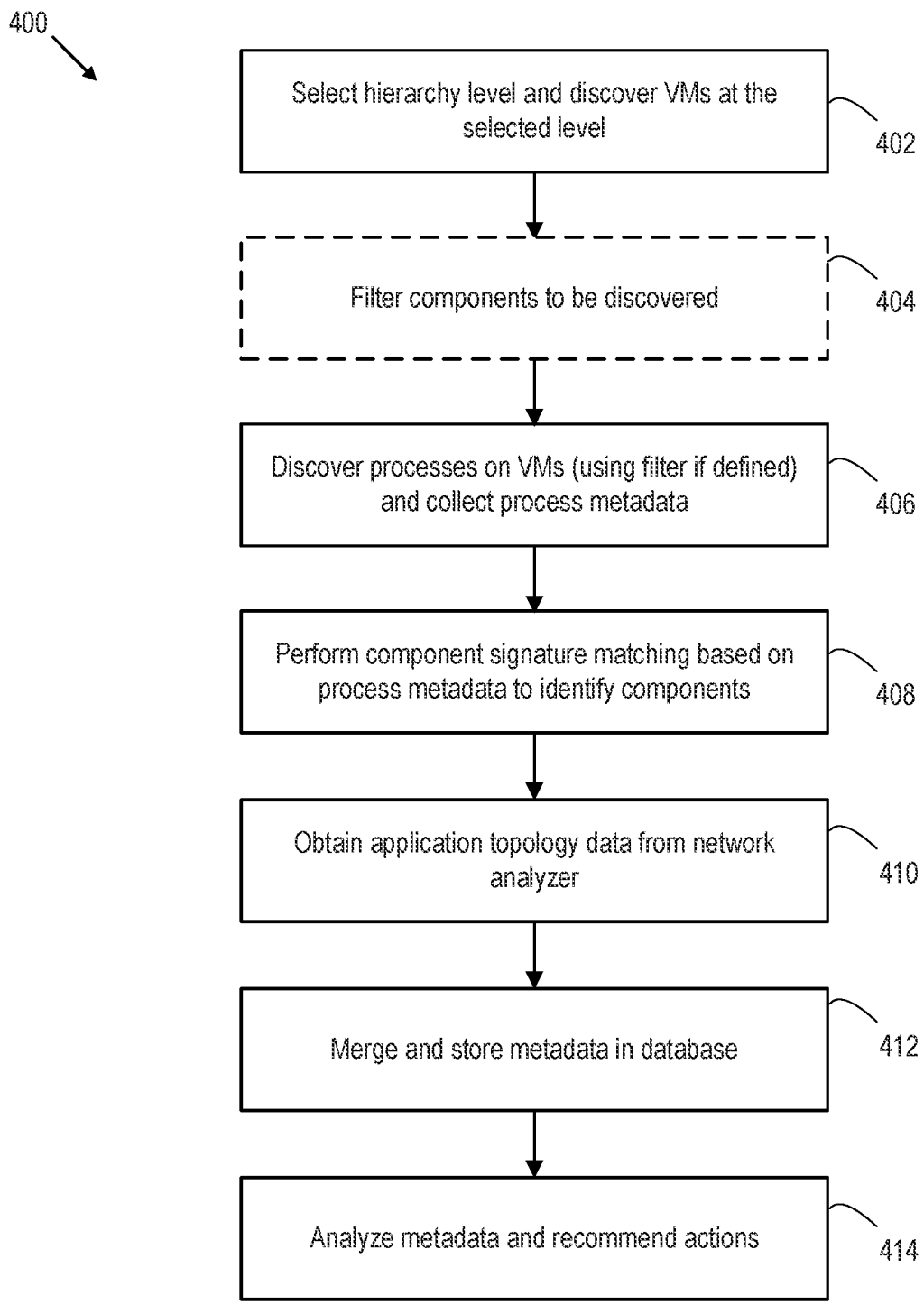
FIG. 4 is a flow diagram depicting a method of obtaining metadata for applications executing in a virtualized computing system according to an embodiment.

FIG. 4 is a flow diagram depicting a method 400 of obtaining metadata for applications executing in a virtualized computing system according to an embodiment. Method 400 begins at step 402, where a user interacts with application analysis software 132 (e.g., through user interface 312) to select a hierarchy level for VM discovery. For example, the user can choose to discover VMs spread across a particular level, such as host cluster 118 managed by virtualization management server 116, a datacenter level (multiple host clusters), a subset of hosts within a host cluster, or the like. Application analysis software 132 then discovers all VMs at the selected level. In an embodiment, application analysis software 132 communicates with virtualization management server 116 through management interface 315 to identify which VMs are deployed at the user-selected level.

At optional step 404, the user can filter the components to be discovered by application analysis software 132. The identified VMs can execute a multitude of processes, not all of which may be of interest. The user can reduce the number of processes to be discovered by filtering for particular processes or for processes that satisfy particular criteria.

At step 406, application analysis software 132 discovers processes on the VMs and collects process metadata. Application analysis software 132 applies any defined filters when searching for processes on the VMs. In embodiments, application analysis software 132 installs a CPDA 203 on each VM being scanned. CPDA 203 scans executing processes on the VM and obtains process metadata from OS-defined processes data structures (complying with any defined filters). CPDA 203 then returns the process metadata to application analysis software 132. The step 406 can process parallel batches of VMs. The CPDA execution can also be done by parallel processing (multi-threaded).

At step 408, application analysis software 132 performs component signature matching based on the process metadata to identify application components. In embodiments, application analysis software 132 generates signatures for the discovered processes using the process metadata and optionally custom metadata and compares the generated signatures to those in signature database 306 to identify components.

At step 410, application analysis software 132 obtains application topology data from network analyzer 113. Network analyzer 113 detects traffic flows between VMs and application analysis software 132 maps these netflows to identified application components using process open ports and VM specific details. Application analysis software 132 can also determine any external services used by application from the netflows. At step 412, application analysis software 132 merges and stores the collected metadata in application metadata database 134, along with information for identified applications 320 (e.g., components 322 and topology 324).

In embodiments, application analysis software 132 executes method 400 and obtains the collected metadata, components 322, and topology 324 in real-time on demand. Further, application analysis software 132 can execute method 400 multiple times to refresh the collected information over time.

At step 414, application analysis software 132 or other software executing in virtualized computing system 100 analyzes the information in application metadata database 134 and generates one or more recommended actions impacting the applications. Example recommended actions include moving one or more applications or application components to different host(s), moving one or more applications or application components from executing in VMs to executing in containers or vice versa, moving one or more applications or application components from an on-premises data center to a cloud or vice versa, upgrading the application/components to a higher version, changing library dependence of the application/components, and the like. In addition, admins/users can copy the information in application metadata database 134 to other external databases, such as a change management database (CMDB), asset management database, or the like. The level of process metadata in application metadata database 134 is not available across various other systems and databases that may be able to make use of such data.

Figure 5:
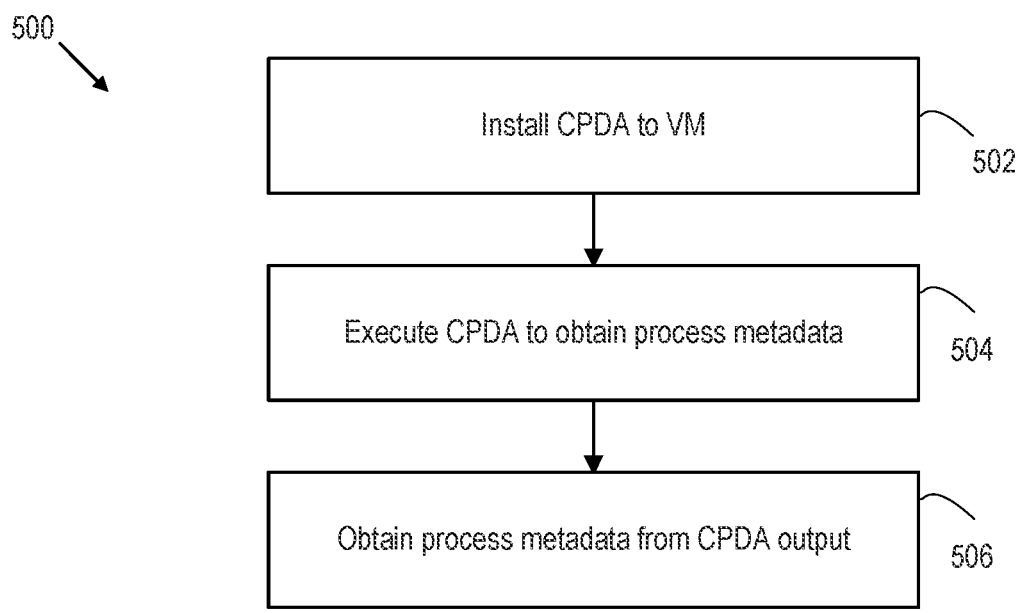
FIG. 5 is a flow diagram depicting a method of obtaining process metadata from a VM according to an embodiment.

FIG. 5 is a flow diagram depicting a method 500 of obtaining process metadata from a VM according to an embodiment. Method 500 may be performed at step 406 for each discovered VM at the selected hierarchy level. Method 500 begins at step 502, where application analysis software 132 installs CPDA 203 to the VM. At step 504, application analysis software 132 triggers execution of CPDA 203 to obtain process metadata. CPDA 203 can read process data structures maintained by OS 204 to obtain the process metadata. At step 506, application analysis software 132 obtains the collected process metadata from output of CPDA 203.

Figure 6:
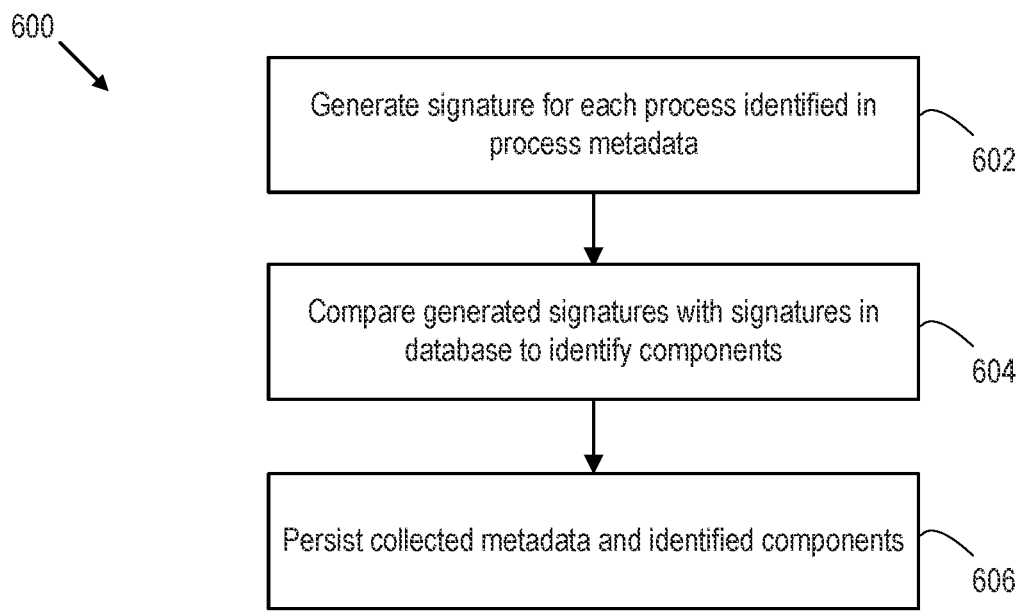
FIG. 6 is a flow diagram depicting a method of identifying application components from process metadata according to an embodiment.

FIG. 6 is a flow diagram depicting a method 600 of identifying application components from process metadata according to an embodiment. Method 600 may be performed to implement steps 408-412 of method 400. Method 600 begins at step 602, where application analysis software 132 generates a signature for each process identified in the process metadata. In embodiments, a component signature includes one or more regular expressions generated from the process metadata (e.g., a regular expression including the process name/executable path and a regular expression encoding a process's command line arguments).

At step 604, application analysis software 132 compares each generated signature against the known signatures in signature database 306 to identify components. In this manner, each process is associated with a component. Any unknown processes can be flagged as unknown for later analysis by the user. At step 606, application analysis software 132 persists collected metadata and identified components in application metadata database 134.

Figure 7:
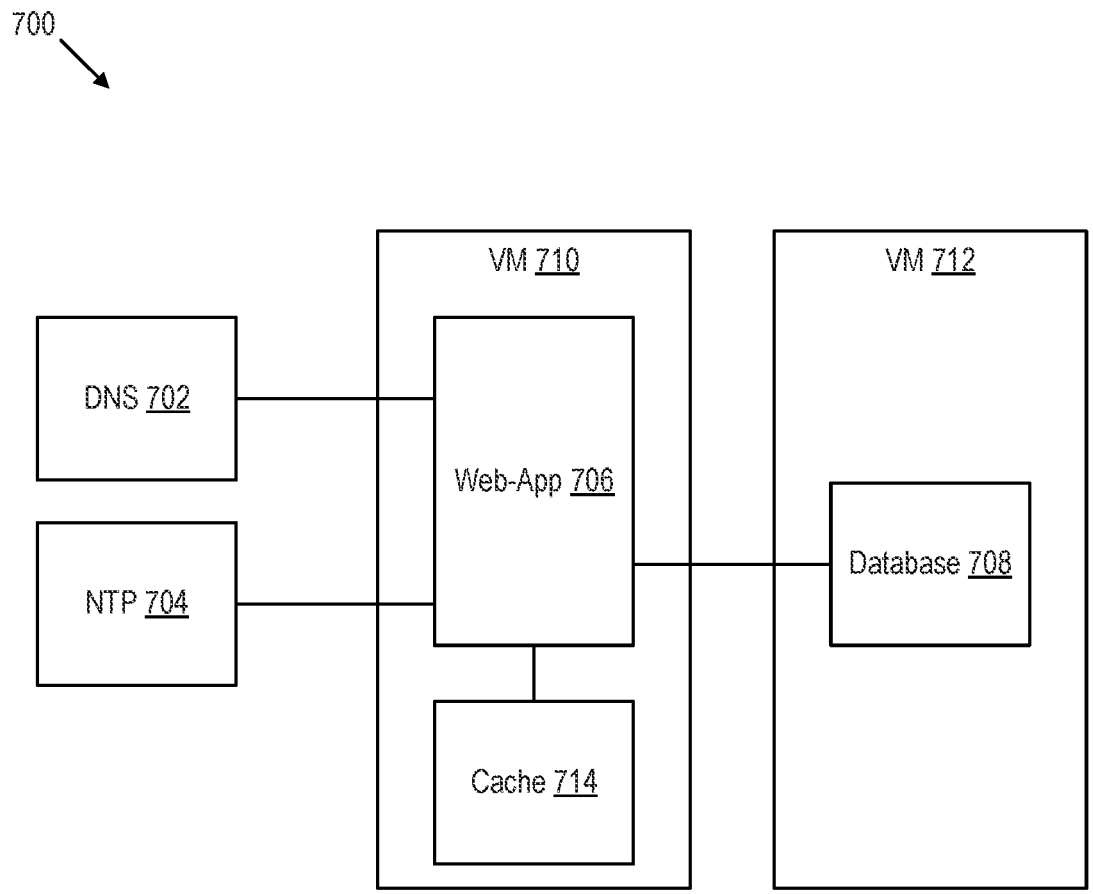
FIG. 7 is a block diagram depicting an application according to an embodiment.

FIG. 7 is a block diagram depicting an application 700 according to an embodiment. Application 700 executes in a pair of VMs 710 and 712. A web-app 706 executes in VM 710. Web-app stores and retrieves data from cache 714. Web-app 706 uses external services, which include DNS 702 and NTP 704. Web-app 706 also stores and retrieves data from database 708, which executes in VM 712.

In the example, application analysis software 132 installs CPDA 203 on each VM 710 and 712. CPDA 203 discovers all processes in both VMs 710 and 712, including web-app 706, cache 714, and database 708. Application analysis software 132 generates a signature for web-app 706 using regular expression(s), such as ".*weblogic-launcher.jar.*" or the like. Application analysis software 132 generates similar signatures for cache 714 and database 708. Application analysis software 132 looks up the generated signatures in the signature database identify a component WEBLOGIC matching web-app 706, a component CACHE for cache 714, and a component DATABASE for database 708. Final processing merges the collected metadata and components and persists the data. Dependency collection finds all the communication between Web-App 706, cache 714, and database 708, as well as between web-app 706 and DNS 702 and NTP 704. Application analysis software 132 persists application topology along with the identified components.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of application identification in a virtualized computing system having a cluster of hosts, the hosts including virtualization layers supporting virtual machines (VMs), the method comprising:
   executing, by application analysis software, process discovery agents for the VMs, the process discovery agents installed in the VMs by the application analysis software;
   receiving, at the application analysis software from the process discovery agents, process metadata describing processes executing on the VMs, the process discovery agents obtaining the process metadata by reading process data structures maintained by guest operating systems of the VMs;
   generating signatures for the processes based on the process metadata; and
   determining components of an application based on a comparison of the signatures against known signatures in a signature database.

2. The method of claim 1, further comprising:
   determining, in cooperation with a network analyzer executing in the virtualized computing system, a topology of the components of the application.

3. The method of claim 1, wherein the process discovery agents are configured to obtain the process metadata from process data structures maintained by guest operating systems of the VMs.

4. The method of claim 1, wherein each of the signatures comprises at least one regular expression for a respective one of the processes derived from the process metadata.

5. The method of claim 1, wherein the step of determining the components comprises:
   identifying each component from a match between a respective signature and a respective known signature.

6. The method of claim 1, further comprising:
   determining first network connections among the components; and
   determining second network connections between at least one of the components and at least one external service.

7. The method of claim 1, further comprising:
   persisting the process metadata and information describing the application and the components in a database.

8. A non-transitory computer readable medium comprising instructions to be executed in a computing device to cause the computing device to carry out a method of application identification in a virtualized computing system having a cluster of hosts, the hosts including virtualization layers supporting virtual machines (VMs), the method comprising:
   executing, by application analysis software, process discovery agents for the VMs, the process discovery agents installed in the VMs by the application analysis software;
   receiving, at the application analysis software from the process discovery agents, process metadata describing processes executing on the VMs, the process discovery agents obtaining the process metadata by reading process data structures maintained by guest operating systems of the VMs;
   generating signatures for the processes based on the process metadata; and
   determining components of an application based on a comparison of the signatures against known signatures in a signature database.

9. The non-transitory computer readable medium of claim 8, further comprising:
   determining, in cooperation with a network analyzer executing in the virtualized computing system, a topology of the components of the application.

10. The non-transitory computer readable medium of claim 8, wherein the process discovery agents are configured to obtain the process metadata from process data structures maintained by guest operating systems of the VMs.

11. The non-transitory computer readable medium of claim 8, wherein each of the signatures comprises at least one regular expression for a respective one of the processes derived from the process metadata.

12. The non-transitory computer readable medium of claim 8, wherein the step of determining the components comprises:
    identifying each component from a match between a respective signature and a respective known signature.

13. The non-transitory computer readable medium of claim 8, further comprising:
    determining first network connections among the components; and
    determining second network connections between at least one of the components and at least one external service.

14. The non-transitory computer readable medium of claim 8, further comprising:
    persisting the process metadata and information describing the application and the components in a database.

15. A virtualized computing system having a cluster comprising hosts connected to a network, the hosts including virtualization layers, the virtualized computing system comprising:
    virtual machines (VMs) executing on the virtualization layers; and
    a server configured to execute application analysis software, the application analysis software configured to:
      execute process discovery agents for the VMs, the process discovery agents installed in the VMs by the application analysis software;
      receive, from the process discovery agents, process metadata describing processes executing on the VMs, the process discovery agents obtaining the process metadata by reading process data structures maintained by guest operating systems of the VMs;
      generate signatures for the processes based on the process metadata; and
      determine components of an application based on a comparison of the signatures against known signatures in a signature database.

16. The virtualized computing system of claim 15, wherein the application analysis software is further configured to:
    determine, in cooperation with a network analyzer executing in the virtualized computing system, a topology of the components of the application.

17. The virtualized computing system of claim 15, wherein the process discovery agents are configured to obtain the process metadata from process data structures maintained by guest operating systems of the VMs.

18. The virtualized computing system of claim 15, wherein each of the signatures comprises at least one regular expression for a respective one of the processes derived from the process metadata.

19. The virtualized computing system of claim 15, wherein the application analysis software is configured to determine the components by:
    identifying each component from a match between a respective signature and a respective known signature.

20. The virtualized computing system of claim 15, wherein the application analysis software is configured to:
   determining first network connections among the components; and
   determining second network connections between at least one of the components and at least one external service.

* * * * *